(12) United States Patent
Zheng et al.

(10) Patent No.: US 8,532,446 B2
(45) Date of Patent: Sep. 10, 2013

(54) SCALABLE SILICON PHOTONIC MULTIPLEXERS AND DEMULTIPLEXERS

(75) Inventors: Xuezhe Zheng, San Diego, CA (US); Ashok V. Krishnamoorthy, San Diego, CA (US); Yeshaiahu Fainman, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 359 days.

(21) Appl. No.: 13/048,250

(22) Filed: Mar. 15, 2011

(65) Prior Publication Data

US 2012/0237155 A1    Sep. 20, 2012

(51) Int. Cl.
*G02B 6/28* (2006.01)
*H04J 14/02* (2006.01)

(52) U.S. Cl.
USPC .............................................. 385/24; 398/84

(58) Field of Classification Search
USPC ........................................................... 398/84
See application file for complete search history.

(56) References Cited

U.S. PATENT DOCUMENTS

2009/0220228 A1*   9/2009  Popovic ........................ 398/48

* cited by examiner

*Primary Examiner* — Jerry Rahll
(74) *Attorney, Agent, or Firm* — Park, Vaughan, Fleming & Dowler, LLP; Steven E. Stupp (57) ABSTRACT

An optical multiplexer/demultiplexer is described. In this optical multiplexer/demultiplexer, multiple coupled-waveguide grating devices are optically coupled to a bus optical waveguide. A given coupled-waveguide grating device has a band-pass filter characteristic that encompasses multiple optical channels, thereby providing coarse optical filtering. Moreover, the optical multiplexer/demultiplexer includes multiple add/drop filters (such as ring resonators) that optically couple to the coupled-waveguide grating devices. A given add/drop filter has a filter bandwidth corresponding to a given optical channel, thereby providing fine optical filtering. Furthermore, the band-pass filter characteristic of the given coupled-waveguide grating device is approximately equal to or less than a free spectral range (FSR) of the given add/drop filter.

20 Claims, 8 Drawing Sheets

SCALABLE SILICON PHOTONIC MULTIPLEXERS AND DEMULTIPLEXERS

GOVERNMENT LICENSE RIGHTS

The United States Government has a paid-up license in this invention and the right in limited circumstances to require the patent owner to license others on reasonable terms as provided for by the terms of Agreement No. HR0011-08-9-0001 awarded by the Defense Advanced Research Projects Administration.

BACKGROUND

1. Field

The present disclosure relates to techniques for communicating optical signals. More specifically, the present disclosure relates to an optical multiplexer/demultiplexer and an optical modulator which include coupled-waveguide grating devices and add/drop filters that, respectively, provide coarse and fine optical filtering.

2. Related Art

Silicon photonics is a promising technology that can be used to provide high-performance, chip-scale communication networks with low cost. Unlike on-chip electrical interconnects in which multiple metal layers are used to transport electrical signals, silicon-photonic interconnects typically use valuable silicon real estate to implement silicon waveguides that route optical signals. In particular, while some of the routing can be performed off-chip, in general these communication networks include significant on-chip routing. In order to minimize the impact on the silicon area, high-density integration is desirable for the silicon-photonic interconnects.

Dense wavelength division multiplexing (DWDM) is a technology for implementing on-chip optical communication networks because it offers the ability to effectively reduce the number of waveguides (and consequently to improve the integration density). In a DWDM link, signals are modulated on to optical carriers to produce optical signals that are conveyed using different wavelength channels in an optical interconnect. However, it has been difficult to implement DWDM links on silicon because of the challenges involved in implementing certain optical components, such as an optical multiplexer/demultiplexer.

A variety of techniques have been investigated for optical multiplexing/demultiplexing on silicon, including: an array-waveguide-grating (AWG) device, an Echelle-grating device, a Mach-Zehnder-based interleaver, cascaded ring-resonator add/drop filters, and coupled-waveguide grating devices. However, an optical multiplexer/demultiplexer based on AWG device, an Echelle-grating device or a Mach-Zehnder-based interleaver typically is large, which is not desirable for area-sensitive intra-chip applications. In principle, a ring-resonator add/drop filter or a coupled-waveguide grating device using a silicon waveguide that has a high index-of-refraction contrast has the potential to make a very compact optical multiplexer/demultiplexer if problems associated with these techniques can be addressed.

For example, an optical multiplexer/demultiplexer can be implemented by cascading multiple ring-resonator add/drop filters along a common bus optical waveguide, where a given ring resonator is tuned to align one of its resonant frequencies with a carrier wavelength associated with a particular optical channel. Note that, because of the periodic resonance structure of the ring resonators, these ring resonators usually have a free spectral range (FSR) that is larger than $n \cdot \delta\lambda$, where n is the number of optical channels in a DWDM link and $\delta\lambda$ is the wavelength spacing between the optical channels. Furthermore, because the FSR of a ring resonator is typically inversely proportional to its size, as the number of optical channels in a DWDM link is increased, the radius of the ring resonators used to implement the add/drop filters in optical multiplexers/demultiplexers usually needs to be decreased.

However, decreasing the radius of a ring resonator typically increases the bending loss, with a commensurate impact on the insertion loss and the Q of the add/drop filter. In addition, although an ultra-compact single ring-resonator add/drop filter having a radius of 3 μm has been demonstrated, thermally tuning such a ring resonator to align the add/drop filter with the carrier wavelength associated with a given optical channel may involve a temperature increase of hundreds of degrees. Such large temperature cycling can adversely impact the reliability of the ring resonator. As a consequence, the FSR of a ring-resonator-based add/drop filter is currently constrained, which can limit the ability to scale the number of optical channels in a DWDM link.

Similarly, coupled-waveguide grating devices can be used to implement compact optical multiplexers/demultiplexers. In this case, corrugation in these devices implements wavelength-selective coupling between the coupled-waveguide grating devices (which provide add/drop filtering) and a bus waveguide that conveys the optical signals associated with the optical channels in a DWDM link. However, such a wavelength-selective coupler typically works well for large bandwidths and has high losses for small bandwidths. As a consequence, a wavelength-selective coupler is often impractical as an add/drop filter in a DWDM link that includes many closely spaced optical channels. Thus, existing coupled-waveguide grating devices also limit the ability to scale the number of optical channels in a DWDM link.

Hence, what is needed is an optical multiplexer/demultiplexer without the above-described problems.

SUMMARY

The described embodiments provide an optical multiplexer/demultiplexer. This optical multiplexer/demultiplexer includes a bus optical waveguide, and multiple coupled-waveguide grating devices that optically couple to the bus optical waveguide. Note that a given coupled-waveguide grating device has a band-pass filter characteristic that encompasses multiple optical channels, thereby providing coarse optical filtering. Moreover, the optical multiplexer/demultiplexer includes multiple add/drop filters that optically couple to the coupled-waveguide grating devices. A given add/drop filter has a filter bandwidth corresponding to a given optical channel, thereby providing fine optical filtering. Furthermore, the band-pass filter characteristic of the given coupled-waveguide grating device is approximately equal to or less than a free spectral range (FSR) of the given add/drop filter.

The add/drop filters may include ring resonators that optically couple the given coupled-waveguide grating device to additional optical waveguides. Also, a given one of the additional optical waveguides may provide an optical signal or may receive the optical signal. Moreover, the ring resonators may have diameters between 1 and 100 μm. Furthermore, a maximum tuning range of a given ring resonator may be approximately its FSR. Additionally, the ring resonators may be thermally tuned.

In some embodiments, the ring resonators have a common design with periodic optical resonances, and different optical channels are associated with different orders of the optical resonances of the ring resonators. Alternatively, the ring resonators may have different sizes so that optical resonances of the ring resonators are separated by a wavelength spacing between the optical channels, thereby reducing an associated tuning range of the ring resonators.

Moreover, in some embodiments the add/drop filters may include Echelle gratings. Furthermore, an FSR of the given coupled-waveguide grating device may be between 10 and 100 nm. Additionally, a grating period of the coupled-waveguide grating devices may vary along the bus optical waveguide.

In some embodiments, the coupled-waveguide grating devices include coupled Bragg gratings.

Another embodiment provides a method for multiplexing optical signals using the optical multiplexer/demultiplexer. During this method, the optical signals are received on the optical waveguides. Then, the optical signals are optically coupled to the coupled-waveguide grating devices using the multiple add/drop filters that are optically coupled to the coupled-waveguide grating devices. Next, the optical signals are optically coupled from the coupled-waveguide grating devices to the bus optical waveguide.

Another embodiment provides an optical modulator. This optical modulator includes: a bus optical waveguide; an optical source that provides an optical signal; and multiple coupled-waveguide grating devices that optically couple to the bus optical waveguide and the optical source. A given coupled-waveguide grating device has a band-pass filter characteristic that encompasses multiple optical channels, thereby providing coarse optical filtering. Moreover, the optical modulator includes multiple ring-resonator modulators that optically couple to the coupled-waveguide grating devices. Note that a given ring-resonator modulator has a modulation characteristic corresponding to a bandwidth of a given optical channel, thereby providing fine optical modulation of the optical signal in the given coupled-waveguide grating device. Furthermore, the band-pass filter characteristic of the given coupled-waveguide grating device is approximately equal to or less than an FSR of the given ring-resonator modulator.

Note that the optical source may include a continuous-wave optical source. Moreover, the ring-resonator modulators may have diameters between 10 and 100 μm. Furthermore, a maximum tuning range of a given ring-resonator modulator may be approximately its FSR. Additionally, the ring-resonator modulators may be thermally tuned and may be electrically modulated.

In some embodiments, the ring-resonator modulators have a common design with periodic optical resonances, and different optical channels are associated with different orders of the optical resonances of the ring-resonator modulators. Alternatively, the ring-resonator modulators may have different sizes so that optical resonances of the ring-resonator modulators are separated by a wavelength spacing between the optical channels, thereby reducing an associated tuning range of the ring-resonator modulators.

Furthermore, an FSR of the given coupled-waveguide grating device may be between 10 and 100 nm. Additionally, a grating period of the coupled-waveguide grating devices may vary along the bus optical waveguide.

Another embodiment provides a method for modulating optical signals using the optical modulator. During this method, an optical signal is provided by an optical source. This optical signal is conveyed to multiple ring-resonator modulators using optical waveguides. Then, the optical signal is modulated in the ring-resonator modulators to produce multiple modulated optical signals, and these modulated optical signals are optically coupled to coupled-waveguide grating devices using the multiple ring-resonator modulators that are optically coupled to the coupled-waveguide grating devices. Next, the modulated optical signals are optically coupled from the coupled-waveguide grating devices to the bus optical waveguide.

Another embodiment provides a system that includes the optical multiplexer/demultiplexer and/or the optical modulator.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an optical multiplexer/demultiplexer, an optical modulator, a system that includes the optical multiplexer/demultiplexer and/or the optical modulator, a technique for multiplexing optical signals, and a technique for modulating optical signals are described. In the optical multiplexer/demultiplexer, multiple coupled-waveguide grating devices are optically coupled to a bus optical waveguide. A given coupled-waveguide grating device has a band-pass filter characteristic that encompasses multiple optical channels, thereby providing coarse optical filtering. Moreover, the optical multiplexer/demultiplexer includes multiple add/drop filters (such as ring resonators) that optically couple to the coupled-waveguide grating devices. A given add/drop filter has a filter bandwidth corresponding to a given optical channel, thereby providing fine optical filtering. Furthermore, the band-pass filter characteristic of the given coupled-waveguide grating device is approximately equal to or less than a free spectral range (FSR) of the given add/drop filter.

By providing coarse and fine optical filtering, the optical multiplexer/demultiplexer facilitates a variety of applications, such as on-chip multiplexing and demultiplexing in a dense wavelength division multiplexing (DWDM) link. Similarly, the optical modulator also facilitates on-chip modulation of optical signals in the DWDM link. In this way, the optical multiplexer/demultiplexer and the optical modulator can be used to reduce the number of waveguides (and consequently to improve the integration density) in on-chip communication networks. This capability can reduce the silicon area used by the silicon-photonic interconnects, and thus can reduce the cost of a chip that includes such communication networks, as well as the cost of an associated system that includes this component (such as high-performance computing systems). Therefore, these optical components can facilitate scaling of on-chip communication networks.

Figure 1A:
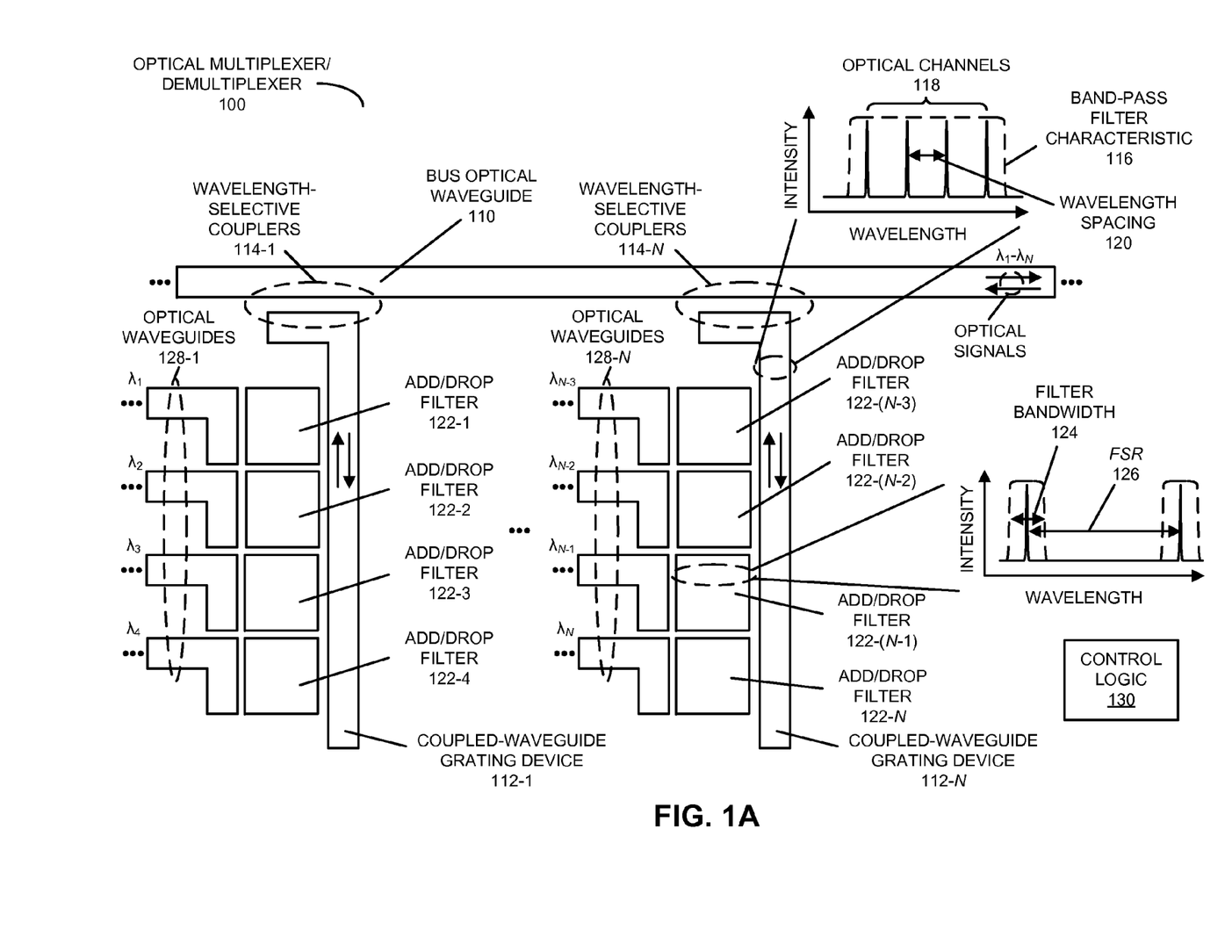
FIG. 1A is a block diagram of an optical multiplexer/demultiplexer in accordance with an embodiment of the present disclosure.

We now describe embodiments of the optical multiplexer/demultiplexer. FIG. 1A presents a block diagram of an optical multiplexer/demultiplexer 100. This optical multiplexer/demultiplexer includes a bus optical waveguide 110, and multiple coupled-waveguide grating devices 112 (which are sometimes referred to as 'coupled corrugated vertical-waveguide grating devices') that optically couple to bus optical waveguide 110. Note that a given coupled-waveguide grating device (such as coupled-waveguide grating device 112-1) has a band-pass filter characteristic 116 that encompasses multiple optical channels 118 in an optical link (such as a DWDM link), thereby providing coarse optical filtering. Furthermore, an FSR of the given coupled-waveguide grating device may be between 10 and 100 nm. Additionally, a grating period of coupled-waveguide grating devices 112 may vary along bus optical waveguide 110. For example, wavelength-selective couplers 114 with different grating periods may be used to implement the optical coupling between coupled-waveguide grating devices 112 and bus optical waveguide 110 (which is illustrated further below with reference to FIG. 3).

Moreover, optical multiplexer/demultiplexer 100 includes multiple add/drop filters 122 that optically couple to coupled-waveguide grating devices 112. A given add/drop filter (such as add/drop filter 122-1) has a filter bandwidth 124 corresponding to a given optical channel (i.e., the given add/drop filter can separate out the given optical channel from optical channels 118), thereby providing fine optical filtering. Furthermore, band-pass filter characteristic 116 of the given coupled-waveguide grating device is approximately equal to or less than a free spectral range (FSR) 126 of the given add/drop filter.

Figure 1B:
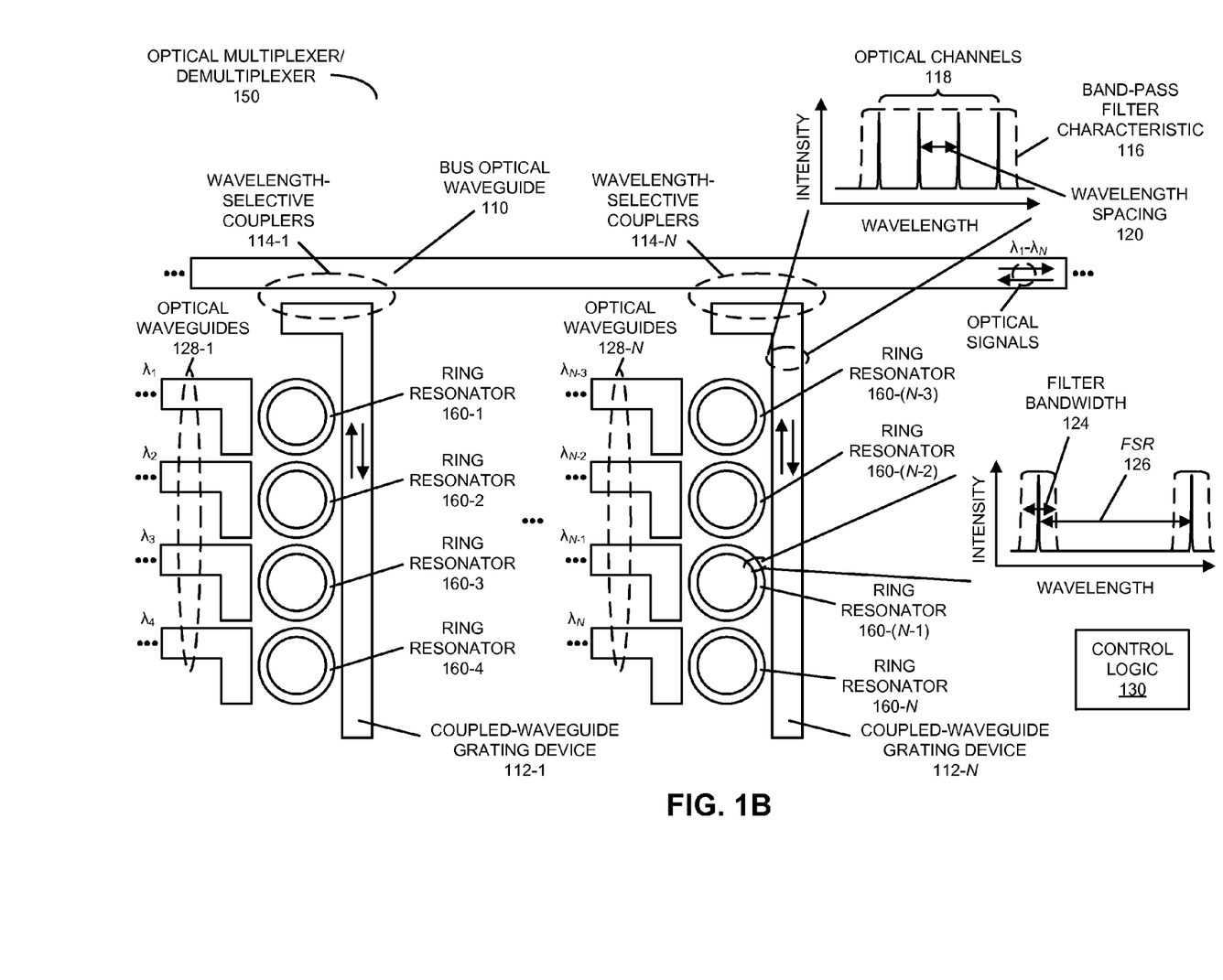
FIG. 1B is a block diagram of an optical multiplexer/demultiplexer in accordance with an embodiment of the present disclosure.

As shown in FIG. 1B, which presents a block diagram of an optical multiplexer/demultiplexer 150, note that add/drop filters 122 (FIG. 1A) may include ring resonators 160 that optically couple the given coupled-waveguide grating device to additional optical waveguides 128. (Alternatively or additionally, in some embodiments add/drop filters 122 in FIG. 1A include Echelle gratings.) A given one of the additional optical waveguides (such as optical waveguide 128-1) may provide an optical signal or may receive the optical signal. Thus, optical multiplexer/demultiplexer 100 (FIG. 1A) or 150 may add or remove optical signals from bus optical waveguide 110.

Furthermore, a given ring resonator in ring resonators 160 (such as ring resonator 160-1) may be characterized by its: quality (Q) factor, bandwidth, coupling wavelength to optical waveguides 128, and/or FSR (or, equivalently, its size, such as the radius or diameter of the given ring resonator). In some embodiments, ring resonators 160 have diameters between 1 and 100 µm (for example, the diameters may be between 10-12 nm). Additionally, a maximum tuning range of the given ring resonator may be approximately its FSR. Note that ring resonators 160 may be thermally tuned, for example, using resistive heaters (not shown) based on control signals provided by control logic 130

In some embodiments, ring resonators 160 have a common design with periodic optical resonances, and different optical channels are associated with different orders of the optical resonances of ring resonators 160. Alternatively, ring resonators 160 may have different sizes so that optical resonances of ring resonators 160 are separated by a wavelength spacing 120 between optical channels 118, thereby reducing an associated tuning range of ring resonators 160.

In an exemplary embodiment, optical multiplexer/demultiplexer 100 (FIG. 1A) or 150 is used in a 32-channel DWDM link. This optical multiplexer/demultiplexer includes eight coupled-waveguide grating devices and 32 ring-resonator add/drop filters (which are arranged into eight groups). For a wavelength spacing between the optical channels of 1.6 nm, each of the coupled-waveguide grating devices may have an FSR greater than 50 nm and a band-pass filter characteristic of approximately 5-6 nm. Furthermore, the ring-resonator add/drop filters may have FSRs of 5 nm, which corresponds to ring diameters of 30 µm. This may be easier to fabricate than smaller ring resonators, and may offer good optical performance. As noted previously, in some embodiments the periodic resonances of the ring resonators may be used, so that the eight groups of ring-resonator add/drop filters associated with different bands of optical channels can have the same design. In these embodiments, the different optical channels in a given band may be associated with different order ring resonances. Note that the maximum wavelength tuning required may be one full FSR of the ring resonator (which, in this example, is 5 nm).

Figure 2:
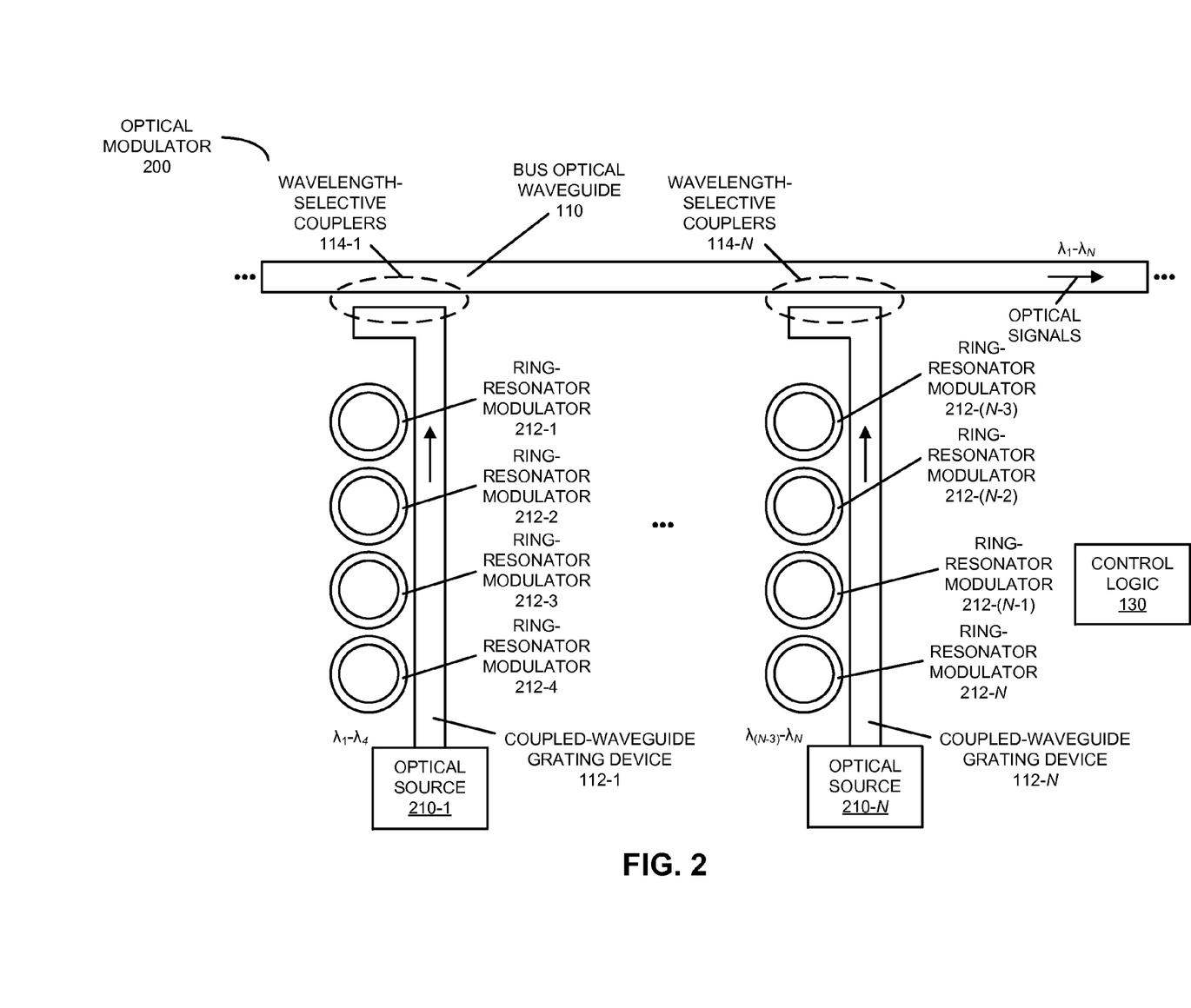
FIG. 2 is a block diagram of an optical modulator in accordance with an embodiment of the present disclosure.

A similar technique may be used to implement an optical modulator, which may be used as a transmitter in an optical link. This is shown in FIG. 2, which presents a block diagram of an optical modulator 200. This optical modulator includes: bus optical waveguide 110; one or more optical sources 210 (such as continuous-wave optical sources) that provide an optical signal (such as one or more carrier wavelengths for use in one or more of optical channels 118 shown in FIGS. 1A and 1B); and multiple coupled-waveguide grating devices 112 that optically couple to bus optical waveguide 110 and the one or more optical sources 210. Once again, a given coupled-waveguide grating device (such as vertical-waveguide grating device 112-1) has a band-pass filter characteristic 116 (shown in FIGS. 1A and 1B) that encompasses multiple optical channels 118 (shown in FIGS. 1A and 1B) in an optical link (such as a DWDM link), thereby providing coarse optical filtering. Furthermore, an FSR of the given coupled-waveguide grating device may be between 10 and 100 nm. Additionally, a grating period of coupled-waveguide grating devices 112 may vary along bus optical waveguide 110. For example, wavelength-selective couplers 114 with different grating periods may be used to implement the optical coupling between coupled-waveguide grating devices 112 and bus optical waveguide 110 (which is illustrated further below with reference to FIG. 3).

Moreover, optical modulator 200 includes multiple cascaded ring-resonator modulators 212 that optically couple to coupled-waveguide grating devices 112. Note that a given ring-resonator modulator (such as ring-resonator modulator 212-1) has a modulation characteristic corresponding to a bandwidth of a given optical channel (i.e., to a wavelength spacing 120 between optical channels 118 shown in FIGS. 1A and 1B), thereby providing fine optical modulation of the optical signal in the given coupled-waveguide grating device. Furthermore, band-pass filter characteristic 116 (shown in FIGS. 1A and 1B) of the given coupled-waveguide grating device may be approximately equal to or less than an FSR 126 (shown in FIGS. 1A and 1B) of the given ring-resonator modulator.

Note that ring-resonator modulators 212 may have diameters between 10 and 100 μm. Furthermore, a maximum tuning range of a given ring-resonator modulator may be approximately its FSR. Additionally, ring-resonator modulators 212 may be thermally tuned (for example, using resistive heaters that are not shown) and may be electrically modulated (for example, using a p-i-n tuner) to produce modulated optical signals from the optical signal, which are conveyed on bus optical waveguide 110. This thermal tuning and electrical modulation may be based on control signals provided by control logic 130. In some embodiments, the electrical modulation is at 10 Gb/s.

For example, the output signal from the one or more optical sources 210, with appropriate tuning of the wavelengths, may be used in corresponding optical channels in an optical link. In particular, one or more wavelengths output by the one or more optical sources 210 may be modulated by one or more ring-resonator modulators 212 to encode data for a given optical channel onto wavelengths in the one or more wavelengths. This modulation may be independent of that performed by other ring-resonator modulators 212 on other wavelengths in the output signal. After a given wavelength has been modulated, the modulated optical signals may be combined onto a common optical link (i.e., bus optical waveguide 110). (In general, the optical signals can be modulated before or after combining.)

In some embodiments, ring-resonator modulators 212 have a common design with periodic optical resonances, and different optical channels are associated with different orders of the optical resonances of ring-resonator modulators 212. Alternatively, ring-resonator modulators 212 may have different sizes so that optical resonances of ring-resonator modulators 212 are separated by a wavelength spacing 120 (shown in FIGS. 1A and 1B) between optical channels 118 (shown in FIGS. 1A and 1B), thereby reducing an associated tuning range of ring-resonator modulators 212.

While the preceding discussion used ring-resonator modulators 212, which can provide narrow-band modulation (for example, a small ring-resonance shift on the order of a few tens of picometers), in principle either narrow-band or broadband modulation may be used in optical modulator 200. When narrow-band modulation is used, the wavelengths for each of optical channels 118 (shown in FIGS. 1A and 1B) may need to have a very narrow line width (such as less than a few picometers). Therefore, these embodiments may use highly accurate tuning of these components. Alternatively, if broadband modulators are used to encode data on the output signal from the one or more (multiple-wavelength) optical sources 210 (such as a Mach-Zehnder-interferometer modulator, an electro-absorption modulator, and/or a modulator that has a bandwidth greater than 10 nm), the wavelength line widths may be relaxed to sub-nanometers if the transmission is high-speed (e.g., greater than 10 Gbps) and is over short distances.

Note that in some embodiments the given ring-resonator modulator has an FSR of 5 nm (which corresponds to a radius of 30 nm). Such a large ring-resonator modulator may facilitate the integration of a modulation junction and thermal tuning in the same ring-resonator modulator.

In an exemplary embodiment, eight groups of cascaded ring-resonator modulators (which may each be associated with a band of optical channels) are multiplexed into one bus optical waveguide to form a 32-channel DWDM transmitter using coupled-waveguide grating devices. As noted previously, the ring-resonator modulators associated with a band of optical channels can be designed to have the same diameters (or slightly different diameters to reduce the tuning range). Note that the ability to use ring-resonators with small FSRs (and thus relatively large diameters) to implement an optical modulator with a large number of optical channels may allow the thermal tuning and the electrical modulation to be integrated in the ring-resonator modulators.

Figure 3:
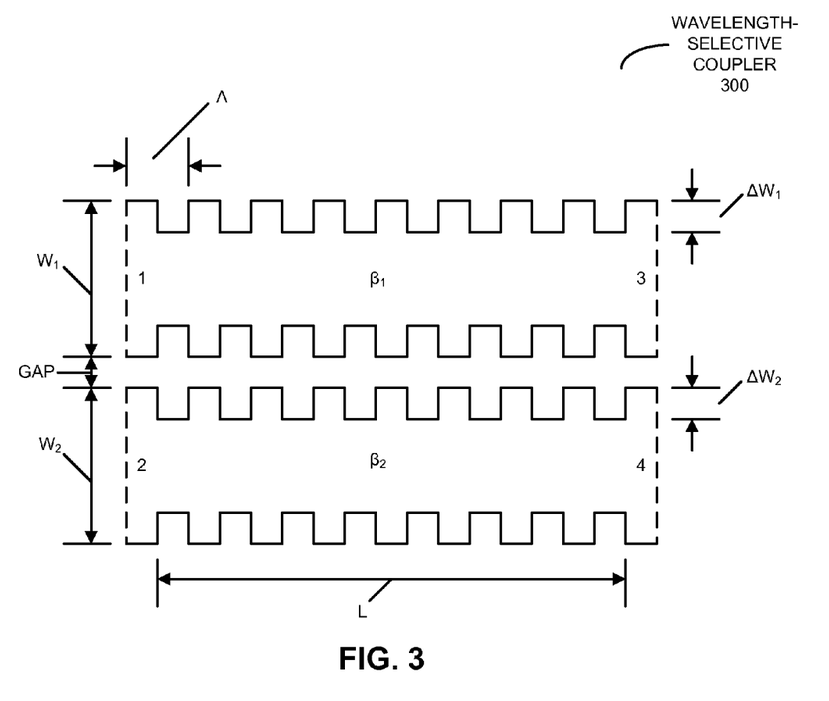
FIG. 3 is a block diagram of a wavelength-selective coupler for use in the optical multiplexer/demultiplexer of FIGS. 1A or 1B, or the optical modulator of FIG. 2 in accordance with an embodiment of the present disclosure.

FIG. 3 presents a block diagram of a wavelength-selective coupler 300 for use in optical multiplexer/demultiplexers 100 (FIG. 1A) or 150 (FIG. 1B) and/or optical modulator 200 (FIG. 2). This wavelength-selective coupler between ports 1-4 may include coupled Bragg gratings having widths $W_1$ and $W_2$ and length L. Note that the wave numbers of the Bragg gratings are different and the Bragg condition is satisfied at the wavelengths to be dropped. Furthermore, the condition for cross coupling between the two Bragg gratings is $$\beta_1 + \beta_2 = \frac{2\pi}{\Lambda},$$

where $\beta_1$ and $\beta_2$ are the wave numbers and $\Lambda$ is the Bragg grating period. By adjusting the grating width along bus optical waveguide 110 (FIGS. 1A, 1B and 2), the βs of each Bragg grating can be changed in order to accommodate cross coupling at a desired wavelength for add/drop purposes.

Using wavelength-selective couplers in the coupled-waveguide grating devices with small cross coupling and a long interaction length may facilitate large FSRs to support a larger number of optical channels. Alternatively, the optical channels can be designed to have wider bandwidth with a flat-top filter characteristic using stronger cross coupling with a reduced length of the wavelength-selective couplers.

Additionally, a flat-top filter characteristic may be achieved with the wavelength-selective couplers by using apodization in which Λ varies along bus optical waveguide 110 in FIGS. 1A, 1B and 2. For example, Λ may vary as a raised-cosine-squared function of location along the bus optical waveguide. (In contrast, ring-resonator-based devices typically require the use of higher-order designs with multiple, coupled and accurately controlled ring-resonator devices.) However, by using coupled-waveguide grating devices in the preceding embodiments of the optical devices, weaker wavelength-selective couplers may be needed, which may result in longer Bragg gratings to increase efficiency. For example, to implement an optical multiplexer/demultiplexer with a wavelength spacing between optical channels of 1.6 nm channel spacing and good channel isolation, the Bragg gratings in the wavelength-selective couplers may have lengths of a couple of millimeters. Such large structures may be more susceptible to manufacturing errors and may be more difficult to be fabricated accurately.

Figure 4:
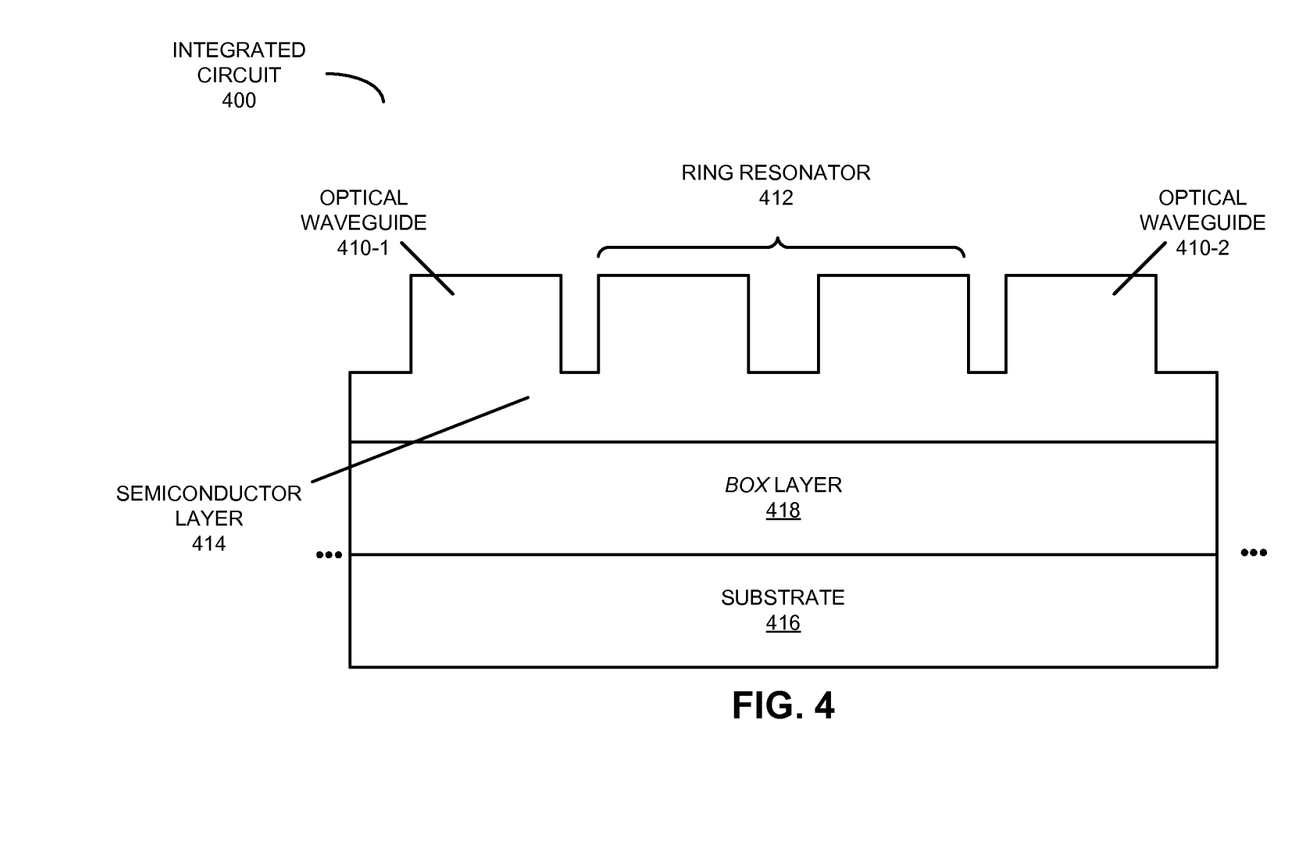
FIG. 4 is a block diagram illustrating an integrated circuit that includes the optical multiplexer/demultiplexer of FIGS. 1A or 1B and/or the optical modulator of FIG. 2 in accordance with an embodiment of the present disclosure.

In some embodiments, optical multiplexer/demultiplexer 100 (FIG. 1A) or 150 (FIG. 1B) and/or optical modulator 200 (FIG. 2) are disposed on an integrated circuit. This is shown in FIG. 4, which presents a block diagram illustrating an integrated circuit 400. In this integrated circuit, optical waveguides 410, ring resonators or ring-resonator modulators (such as ring resonator 412) and coupled-waveguide grating devices may be defined in a semiconductor layer 414. Furthermore, integrated circuit 400 may include a substrate 416 and a buried-oxide (BOX) layer 418 deposited on substrate 416, where semiconductor layer 414 is disposed on buried-oxide layer 418.

Note that substrate 416 may include silicon, buried-oxide layer 418 may include a dielectric or an oxide (such as silicon dioxide), and/or semiconductor layer 414 may include silicon (thus, optical waveguides 410 may include silicon waveguides). Therefore, substrate 416, buried-oxide layer 418 and semiconductor layer 414 may constitute a silicon-on-insulator (SOI) technology. In some embodiments, the silicon in semiconductor layer 414 is 0.5 µm thick, and the silicon-dioxide layer may have a thickness between 0.1 and 10 µm.

Note that in the embodiments, such as FIGS. 1A, 1B and 2, the light is confined in semiconductor layer 414 and may be surrounded on all sides (including below) by an oxide. However, in other embodiments a different confinement may be used, such as a polymer deposited on an oxide, or poly-silicon surrounded by an oxide (in which case buried-oxide layer 418 may not be needed).

Figure 5:
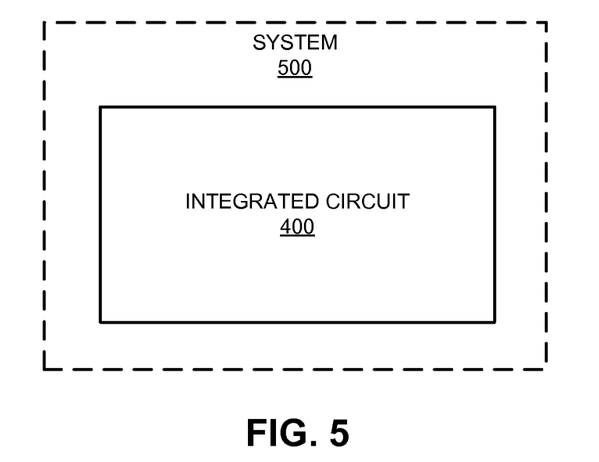
FIG. 5 is a block diagram illustrating a system that includes the optical multiplexer/demultiplexer of FIGS. 1A or 1B and/or the optical modulator of FIG. 2 in accordance with an embodiment of the present disclosure.

One or more of the preceding embodiments of optical multiplexer/demultiplexer 100 (FIG. 1A) or 150 (FIG. 1B) and/or optical modulator 200 (FIG. 2) may be included in a system and/or an electronic device. This is illustrated in FIG. 5, which presents a block diagram illustrating a system 500 that includes integrated circuit 400.

Optical multiplexer/demultiplexer 100 (FIG. 1A), optical multiplexer/demultiplexer 150 (FIG. 1B), and/or optical modulator 200 (FIG. 2) may be used in a variety of applications, including: VLSI circuits, communication systems (such as WDM), storage area networks, data centers, networks (such as local area networks), and/or computer systems (such as multiple-core processor computer systems). Note that system 500 may include, but is not limited to: a server, a laptop computer, a communication device or system, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. Moreover, note that a given computer system may be at one location or may be distributed over multiple, geographically dispersed locations.

Figure 6:
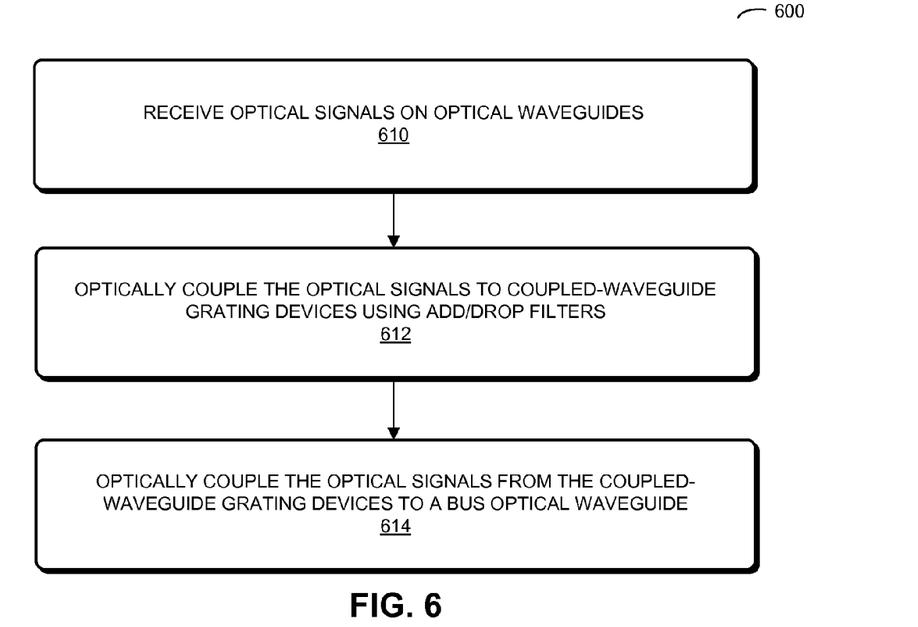
FIG. 6 is a flow chart illustrating a method for multiplexing optical signals using the optical multiplexer/demultiplexer of FIGS. 1A or 1B in accordance with an embodiment of the present disclosure.

We now describe embodiments of the techniques. FIG. 6 presents a flow chart illustrating a method 600 for multiplexing optical signals using optical multiplexer/demultiplexer 100 (FIG. 1A) or 150 (FIG. 1B). During this method, the optical signals are received on the optical waveguides (operation 610). Then, the optical signals are optically coupled to the coupled-waveguide grating devices using the multiple add/drop filters that are optically coupled to the coupled-waveguide grating devices (operation 612). Next, the optical signals are optically coupled from the coupled-waveguide grating devices to the bus optical waveguide (operation 614).

Figure 7:
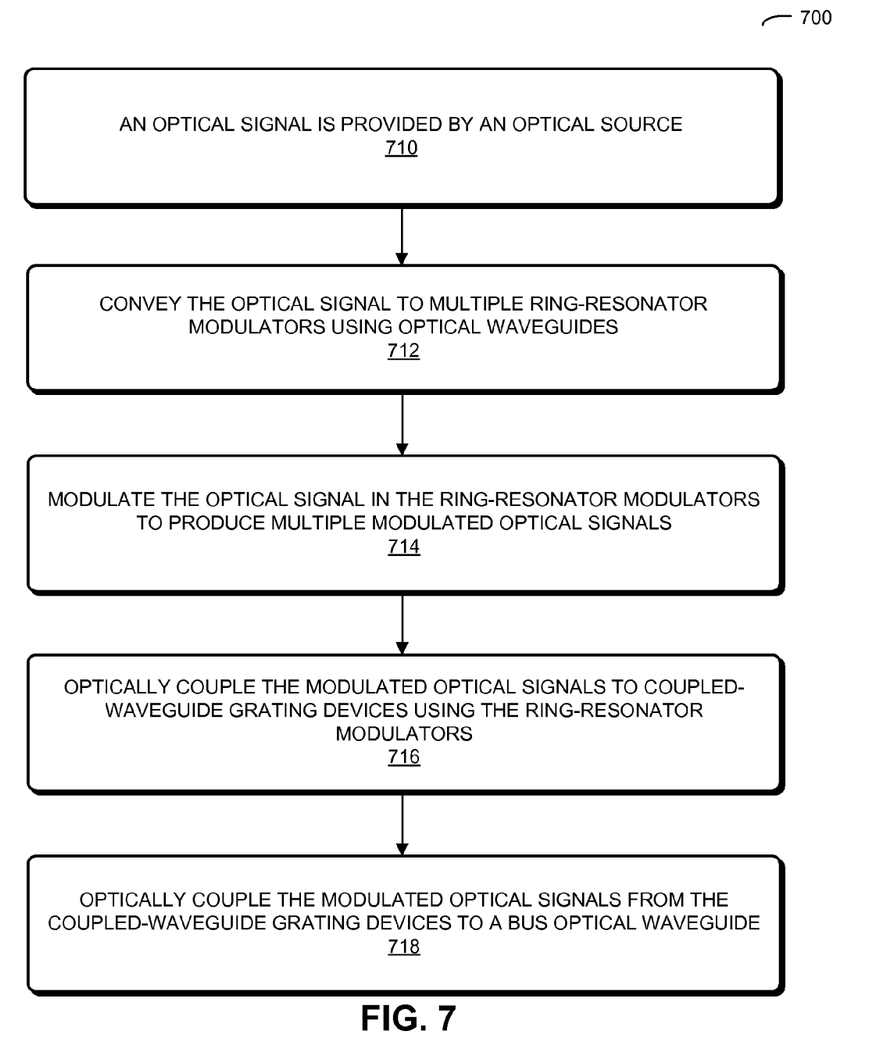
FIG. 7 is a flow chart illustrating a method for modulating optical signals using the optical modulator of FIG. 2 in accordance with an embodiment of the present disclosure.

FIG. 7 presents a flow chart illustrating a method 700 for modulating optical signals using optical modulator 200 (FIG. 2). During this method, an optical signal is provided by an optical source (operation 710). This optical signal is conveyed to multiple ring-resonator modulators using optical waveguides (operation 712). Then, the optical signal is modulated in the ring-resonator modulators to produce multiple modulated optical signals (operation 714), and these modulated optical signals are optically coupled to coupled-waveguide grating devices using the multiple ring-resonator modulators that are optically coupled to the coupled-waveguide grating devices (operation 716). Next, the modulated optical signals are optically coupled from the coupled-waveguide grating devices to the bus optical waveguide (operation 718).

In some embodiments of methods 600 (FIG. 6) and/or 700, there may be additional or fewer operations. Moreover, the order of the operations may be changed, and/or two or more operations may be combined into a single operation.

Optical multiplexer/demultiplexer 100 (FIG. 1A), optical multiplexer/demultiplexer 150 (FIG. 1B), optical modulator 200 (FIG. 2), wavelength-selective coupler 300 (FIG. 3), integrated circuit 400 (FIG. 4), and/or system 500 (FIG. 5) may include fewer components or additional components. For example, semiconductor layer 414 in FIG. 4 may include poly-silicon or amorphous silicon. Furthermore, a wide variety of fabrication techniques may be used to fabricate optical multiplexer/demultiplexer 100 (FIG. 1A), optical multiplexer/demultiplexer 150 (FIG. 1B) and optical modulator 200 (FIG. 2) in the preceding embodiments, as is known to one of skill in the art. In addition, a wide variety of optical components may be used in or in conjunction with optical multiplexer/demultiplexer 100 (FIG. 1A), optical multiplexer/demultiplexer 150 (FIG. 1B), and optical modulator 200 (FIG. 2) (such as alternative optical filters that replace ring resonators 160 in FIG. 1B). In some embodiments, portions of an optical waveguide in one or more of the preceding embodiments are etched away, thereby making it more periodic (and, thus, modulating the index of refraction).

Additionally, the one or more optical sources 210 (FIG. 2) may include one or more of a wide variety of gain elements, one or more lasers and/or one or more non-lasing optical sources, including: a semiconductor laser, a Fabry-Perot laser, a laser that receives and outputs light from the same facet, a semiconductor optical amplifier, etc.

Although these embodiments are illustrated as having a number of discrete items, the preceding embodiments are intended to be functional descriptions of the various features that may be present rather than structural schematics of the embodiments described herein. Consequently, in these embodiments two or more components may be combined into a single component, and/or a position of one or more components may be changed.

While the preceding embodiments illustrate the use of optical multiplexer/demultiplexer 100 (FIG. 1A), optical multiplexer/demultiplexer 150 (FIG. 1B), and optical modulator 200 (FIG. 2) in conjunction with an optical link (such as an on-chip DWDM link), these optical components may be used in applications other than communications, such as: manufacturing (cutting or welding), a lithographic process, data storage (such as an optical-storage device or system), medicine (such as a diagnostic technique or surgery), a bar-code scanner, entertainment (a laser light show), and/or metrology (such as precision measurements of distance).

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical multiplexer/demultiplexer, comprising:
a bus optical waveguide;

multiple coupled-waveguide grating devices configured to optically couple to the bus optical waveguide, wherein a given coupled-waveguide grating device has a band-pass filter characteristic that encompasses multiple optical channels, thereby providing coarse optical filtering; and multiple add/drop filters configured to optically couple to the coupled-waveguide grating devices, wherein a given add/drop filter has a filter bandwidth corresponding to a given optical channel, thereby providing fine optical filtering, and wherein the band-pass filter characteristic of the given coupled-waveguide grating device is approximately equal to or less than a free spectral range (FSR) of the given add/drop filter.

2. The optical multiplexer/demultiplexer of claim 1, wherein the add/drop filters include ring resonators that are configured to optically couple the given coupled-waveguide grating device to additional optical waveguides; and wherein a given one of the additional optical waveguides is configured to perform at least one of the following operations: provide an optical signal; and receive the optical signal.

3. The optical multiplexer/demultiplexer of claim 2, wherein the ring resonators have diameters between 1 and 100 μm.

4. The optical multiplexer/demultiplexer of claim 2, wherein the ring resonators have a common design with periodic optical resonances; and wherein different optical channels are associated with different orders of the optical resonances of the ring resonators.

5. The optical multiplexer/demultiplexer of claim 2, wherein a maximum tuning range of a given ring resonator is approximately its FSR.

6. The optical multiplexer/demultiplexer of claim 2, wherein the ring resonators are thermally tuned.

7. The optical multiplexer/demultiplexer of claim 1, wherein the add/drop filters include Echelle gratings.

8. The optical multiplexer/demultiplexer of claim 1, wherein an FSR of the given coupled-waveguide grating device is between 10 and 100 nm.

9. The optical multiplexer/demultiplexer of claim 1, wherein a grating period of the coupled-waveguide grating devices varies along the bus optical waveguide.

10. The optical multiplexer/demultiplexer of claim 1, wherein the coupled-waveguide grating devices include coupled Bragg gratings.

11. A method for multiplexing optical signals, wherein the method comprises:

receiving the optical signals on optical waveguides;

optically coupling the optical signals to coupled-waveguide grating devices using multiple add/drop filters that are optically coupled to the coupled-waveguide grating devices, wherein a given add/drop filter has a filter bandwidth corresponding to a given optical channel, thereby providing fine optical filtering; and optically coupling the optical signals from the coupled-waveguide grating devices to a bus optical waveguide, wherein a given coupled-waveguide grating device has a band-pass filter characteristic that encompasses multiple optical channels, thereby providing coarse optical filtering; and wherein the band-pass filter characteristic of the given coupled-waveguide grating device is approximately equal to or less than a free spectral range (FSR) of the given add/drop filter.

12. An optical modulator, comprising:

a bus optical waveguide;

an optical source configured to provide an optical signal;

multiple coupled-waveguide grating devices configured to optically couple to the bus optical waveguide and the optical source, wherein a given coupled-waveguide grating device has a band-pass filter characteristic that encompasses multiple optical channels, thereby providing coarse optical filtering; and multiple ring-resonator modulators configured to optically couple to the coupled-waveguide grating devices, wherein a given ring-resonator modulator has a modulation characteristic corresponding to a bandwidth of a given optical channel, thereby providing fine optical modulation of the optical signal in the given coupled-waveguide grating device, and wherein the band-pass filter characteristic of the given coupled-waveguide grating device is approximately equal to or less than a free spectral range (FSR) of the given ring-resonator modulator.

13. The optical modulator of claim 12, wherein the optical source includes a continuous-wave optical source.

14. The optical modulator of claim 12, wherein the ring-resonator modulators have diameters between 10 and 100 μm.

15. The optical modulator of claim 12, wherein the ring-resonator modulators have a common design with periodic optical resonances; and wherein different optical channels are associated with different orders of the optical resonances of the ring-resonator modulators.

16. The optical modulator of claim 12, wherein a maximum tuning range of a given ring-resonator modulator is approximately its FSR.

17. The optical modulator of claim 12, wherein the ring-resonator modulators are thermally tuned and are electrically modulated.

18. The optical modulator of claim 12, wherein an FSR of the given coupled-waveguide grating device is between 10 and 100 nm.

19. The optical modulator of claim 12, wherein a grating period of the coupled-waveguide grating devices varies along the bus optical waveguide.

20. The optical modulator of claim 12, wherein the coupled-waveguide grating devices include coupled Bragg gratings.

* * * * *